(12) United States Patent
Ormesher et al.

(10) Patent No.: US 8,294,616 B1
(45) Date of Patent: Oct. 23, 2012

(54) USING ANTENNAS SEPARATED IN FLIGHT DIRECTION TO AVOID EFFECT OF EMITTER CLOCK DRIFT IN GEOLOCATION

(75) Inventors: Richard C. Ormesher, Albuquerque, NM (US); Douglas L. Bickel, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 134 days.

(21) Appl. No.: 12/894,402

(22) Filed: Sep. 30, 2010

(51) Int. Cl.
*G01S 5/04* (2006.01)
*G01S 3/02* (2006.01)
(52) U.S. Cl. ......... 342/449; 342/451; 342/463; 342/465
(58) Field of Classification Search .................. 342/449, 342/451, 463, 465
See application file for complete search history.

(56) References Cited

U.S. PATENT DOCUMENTS

| | | | | |
|---|---|---|---|---|
| 5,608,411 A * | 3/1997 | Rose | | 342/417 |
| 5,835,060 A * | 11/1998 | Czarnecki et al. | | 342/442 |
| 6,255,992 B1 * | 7/2001 | Madden | | 342/424 |
| 6,700,536 B1 * | 3/2004 | Wiegand | | 342/417 |
| 6,822,608 B2 * | 11/2004 | Paquelet | | 342/449 |
| 7,233,285 B2 * | 6/2007 | Struckman | | 342/451 |
| 7,286,085 B2 * | 10/2007 | Kolanek et al. | | 342/424 |
| 2007/0115174 A1 * | 5/2007 | Herrick | | 342/420 |

OTHER PUBLICATIONS

Foy, "Postition-Location Solutions by Taylor-Series Estimiation", IEEE Transactions on Aerospace and Electronic Systems, vol. AES-12, No. 2, Mar. 1976, pp. 197-193.

* cited by examiner

*Primary Examiner* — Jack W Keith
*Assistant Examiner* — Cassie Galt
(74) *Attorney, Agent, or Firm* — Scott B. Stahl

(57) ABSTRACT

The location of a land-based radio frequency (RF) emitter is determined from an airborne platform. RF signaling is received from the RF emitter via first and second antennas. In response to the received RF signaling, signal samples for both antennas are produced and processed to determine the location of the RF emitter.

18 Claims, 2 Drawing Sheets

USING ANTENNAS SEPARATED IN FLIGHT DIRECTION TO AVOID EFFECT OF EMITTER CLOCK DRIFT IN GEOLOCATION

This invention was developed under Contract DE-AC04-94AL85000 between Sandia Corporation and the U.S. Department of Energy. The U.S. Government has certain rights in this invention.

FIELD

The present work relates generally to aircraft geolocation of land-based RF emitters and, more particularly, to avoiding adverse effects of emitter clock drift.

BACKGROUND

The geolocation method conventionally employed by a single airborne platform typically uses either TOA (time of arrival) or FOA (frequency of arrival) measurements to determine the geographic locations of signal emitters on the earth. Conventional phase based methods such as POA (phase of arrival) can provide more accurate location, but their performance suffers when the emitter has significant clock drift. Such clock drift may occur, for example, due to local motion of the emitter (e.g., a handheld emitter) or emitter clock instabilities.

It is desirable in view of the foregoing to provide for single platform POA geolocation techniques capable of avoiding problems associated with emitter clock drift.

DETAILED DESCRIPTION

Exemplary embodiments of the present work provide on the airborne platform two antennas that are spatially separated along the flight path direction of the platform. The two antennas (also referred to as an antenna pair) provide for a two channel system that facilitates estimation and removal of unknown phase terms associated with to the drift of the emitter's carrier frequency over an observation interval. A signal phase measurement captured via the first channel is associated with the same spatial location as the signal phase measurement that was immediately previously captured via the second channel, where the first channel corresponds to the aft antenna (see, e.g., antenna 1 in FIG. 1) of the antenna pair.

The difference between the two signal phases captured via the two channels is used to remove the phase change due to platform motion, leaving only a residual phase difference due to the emitter carrier frequency drift that occurred between the two signal phase measurements. This residual phase difference is used to estimate and remove the emitter's phase drift from the phase captured via one or both of the channels. With the phase drift removed, the resulting "corrected" phase is then only a function of the emitter's location and the platform motion (i.e., platform location). Having complete knowledge of platform (and thus antenna pair) location when all of the received signal phase measurements are captured, and having captured multiple distinct phase measurements, the emitter's location can be estimated using standard non-linear least squares methods.

Figure 1:
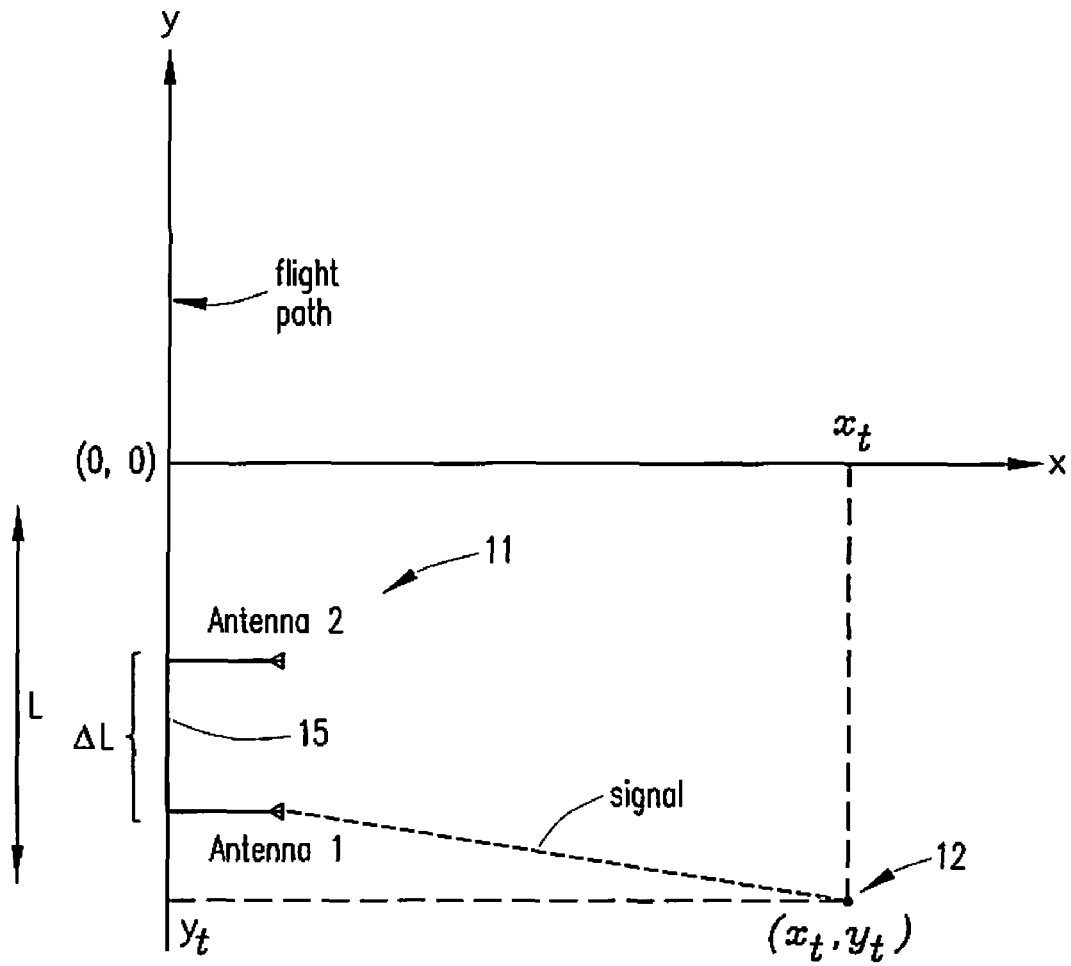
FIG. 1 diagrammatically illustrates geometric relationships between an airborne platform and a land-based emitter in a geolocation scenario according to exemplary embodiments of the present work.

FIG. 1 illustrates a two-dimensional geometry in which principles of the present work may be applied. As shown diagrammatically, an airborne platform 11 is configured with two antennas that are linearly displaced generally along the aircraft's flight path, which is assumed for expository convenience to be a linear flight-path along the y axis of FIG. 1. A passive RF receiver (not explicitly shown in FIG. 1) coupled to the antennas has a separate channel for each antenna. Each channel uses conventional techniques to sample the signal received from a land-based RF emitter 12, and measure the signal's electrical phase. As indicated above, the system is configured such that antenna 1 is sampled while it occupies the same spatial location that antenna 2 occupied at the immediately preceding sampling time. A set of N pairs of phase measurements are collected at spatial sample intervals defined by travel increments of ΔL throughout an overall observation distance L along the flight path. The collected phase measurements are then processed to estimate the emitter's location. The y-axis (flight path direction) separation distance between antenna 1 and antenna 2 is set to ΔL. As shown diagrammatically In FIG. 1, antenna 1 and antenna 2 are supported on airframe 11 at the separation distance ΔL by a suitable antenna mount 15.

Assume, for example, an emitter that transmits a signal defined as $$y_{tx}(t)=\cos(2\pi ft+\phi(t)+\theta), (n-1)T \leq t \leq nT \quad (1)$$

where f is the emitter's carrier frequency, $\phi(t)$ is the emitter's phase noise or jitter due to the emitter's clock instability and $\theta$ is an unknown constant phase term, T is the time interval between phase measurements, and n is an index for the $n^{th}$ phase measurement.

The emitter's phase noise may be modeled as $$\phi(t)=2\pi\mu_f t+2\pi\sigma_f(nT)t=2\pi\mu_f t+\sigma_\phi(nT) \quad (2)$$

where $\mu_f$ is a mean frequency error term and is assumed constant over the entire observation interval and $\sigma_\phi$ is a phase deviation during sample interval T. In some embodiments, the sample interval T is chosen such that $\phi(t)-\phi(t-T)$ will be less than $\pi$. For example, if empirical observation indicates that $\phi(t)-\phi(t-T)$ is expected to be less than $\pi$ radians when T=100 milliseconds, then T is chosen to be 100 milliseconds or less. The received emitter signaling will be sampled via each antenna at each incremental distance ΔL, where ΔL=V×T, and V is the aircraft velocity. Referring again to FIG. 1, if the antenna spacing along the flight path is set to ΔL as shown, then the phase center for antenna 1 will occupy, at sample time n+1, the same spatial location that the phase center of antenna 2 occupied at sample time n. Taking an example aircraft velocity of V=50 meters/second, the corresponding antenna spacing ΔL would be 50×0.1=5 meters.

The signal received at each antenna is given as $$y_{rx}(t)=y_{tx}(t-\tau_n), (n-1)T+\tau_n \leq t \leq nT+\tau_n \quad (3)$$

Where $\tau_n$ is the propagation time-delay from the emitter to the antenna phase center at time t=nT.

Combining equations (1)-(3) gives $$y_{rx}(t)=y_{tx}(t-\tau_n)=\cos(2\pi f(t-\tau_n)+\phi(t-\tau_n)+\theta)=\cos(2\pi ft- \\ 2\pi f\tau_n+2\pi\mu_f(t-\tau_n)+\sigma_{\phi,t_n}+\theta)=\cos(2\pi ft-2\pi f\tau_n+ \\ 2\pi\mu_f t-2\pi\mu_f\tau_n+\sigma_{\phi,t_n}+\theta)=\cos(2\pi(f+\mu_f)t-2\pi(f+\mu_f)\tau_n+ \\ \sigma_{\phi,t_n}+\theta) \quad (4)$$

The second phase term in equation (4) contains the time delay $\tau_n$ which, for a two-dimensional geometry such as shown in FIG. 1, is related to the emitter location by $$c\tau_n = \sqrt{x_t^2 + (y_t - n\Delta L)^2} \tag{5}$$

Other phase terms in equation (4) contain parameters that need to be estimated and removed before the emitter location can be estimated. These parameters include: an unknown constant phase term θ; the aforementioned mean frequency error $\mu_f$; and the emitter's phase deviation $\sigma_{\phi,t_n}$. As described in detail hereinbelow, exemplary embodiments of the present work estimate and remove the mean frequency error $\mu_f$ and the phase deviation parameters $\sigma_{\phi,t_n}$ (thereby effectively compensating for the presence of these undesired signal components), and then use standard non-linear least squares techniques to estimate the location coordinates $(x_t, y_t)$ along with the constant phase term θ. The first phase term in equation (4), $2\pi(f+\mu_f)t$, is the only phase term that varies within the time interval T. It can be assumed that, in most situations, all other phase terms of equation (4) remain constant over the time interval, T.

Some embodiments estimate the unknown mean frequency error term, $\mu_f$, using a simple FFT as follows. The signal received via one of the two channels is mixed to baseband, and then sampled at intervals much smaller than T. Both the mixing and the sampling may be done according to conventional techniques. The sampled baseband signal produced by the sampling operation includes both fast time and slow time samples as follows $$y_{rx,b}(t,t_n) = y_{tx,b}(t-\tau_n,t_n) = \exp(j\{2\pi\mu_f t - 2\pi(f+\mu_f)\tau_n + \sigma_{\phi,t_n} + \theta\}) \text{ for } nT \leq t < (n+1)T \tag{6}$$

where $$t \equiv iT_{ad} \tag{7}$$

and $T_{ad}$ is the fast time sampling interval, i is the fast time sample index, and $t_n$ corresponds to slow time sampling performed at each ΔL increment along the flight path. The fast and slow time samples are typically arranged as columns and rows, respectively, of a rectangular array.

Applying the Fast Fourier Transform (FFT) to the fast-time samples produces $$Y_{rx,b}(f,t_n) = FT\{y_{rx,b}(t-\tau_n,t_n)\} = \delta(\mu_f)\exp(j\{-2\pi(f+\mu_f)\tau_n + \sigma_{\phi,t_n} + \theta\}) \tag{8}$$

Equation (8) defines an array that corresponds to the aforementioned rectangular array, but having columns that contain frequency samples instead of time samples. Each frequency sample of a given column corresponds to a respective value of the frequency index f. For each column, the maximum absolute value in that column is determined. For example, there would be N columns of frequency samples for each channel in the example of FIG. 1 given above. For each of the N maximum absolute values for a given channel, the corresponding index f is determined, and the average of these f index values provides an estimate of $\mu_f$, which estimate is referred to herein as $\hat{\mu}_f$. Some embodiments use data from only a selected one of the channels to produce $\hat{\mu}_f$, while other embodiments use data from both channels.

Various embodiments use various spectral estimation methods to estimate $\mu_f$.

The phase deviation term $\sigma_{\phi,t_n}$ is estimated by determining the difference between the phase measurements captured via the two channels of the two antenna system of FIG. 1. The received signal at each channel for such a two antenna system is as follows $$y_{rx}^1(t,t_n) = y_{tx}(t-\tau_n^1,t_n) = \cos(\vartheta_1(t,t_n))$$

$$y_{rx}^2(t,t_n) = y_{tx}(t-\tau_n^2,t_n) = \cos(\vartheta_2(t,t_n)) \text{ for } nT < t < nT+T \tag{9}$$

where $n = 1, \ldots, N$

The superscripts in equation (9) and hereinafter indicate the channel (antenna) numbers. Equation (9) defines two matrices of sampled data, one for each channel, where the fast time samples are indexed by the variable t and the slow time samples correspond to the time interval $t_n$, where $$t_n = nT < t < nT+T \tag{10}$$

The phase terms of the two matrices of sampled data are defined as $$\vartheta_1(t,t_n) = 2\pi(f+\mu_f)t - 2\pi(f+\mu_f)\tau_n^1 + \sigma_{\phi,t_n} + \theta \text{ for } nT < t < nT+T \tag{11}$$

$$\vartheta_2(t,t_n) = 2\pi(f+\mu_f)t - 2\pi(f+\mu_f)\tau_n^2 + \sigma_{\phi,t_n} + \theta \text{ for } nT < t < nT+T \tag{12}$$

At time interval 'n+1, $$\vartheta_1(t,t_{n+1}) = 2\pi(f+\mu_f)t - 2\pi(f+\mu_f)\tau_{n+1}^1 + \sigma_{\phi,t_{n+1}} + \theta(n+1)T < t < (n+1)T+T \tag{13}$$

and $$\vartheta_2(t,t_{n+1}) = 2\pi(f+\mu_f)t - 2\pi(f+\mu_f)\tau_{n+1}^2 + \sigma_{\phi,t_{n+1}} + \theta(n+1)T < t < (n+1)T+T \tag{14}$$

Recall (with reference to FIG. 1) that, with ΔL=V×T, the phase center for antenna 1 will occupy, at sample time n+1, the same spatial location that the phase center of antenna 2 occupied at sample time n. This means that $$\tau_n^2 = \tau_{n+1}^1. \tag{15}$$

Equation (13) may therefore be expressed as $$\vartheta_1(t,t_{n+1}) = 2\pi(f+\mu_f)(t+T) - 2\pi(f+\mu_f)\tau_{n+1}^1 + \sigma_{\phi,t_{n+1}} + \theta(n)T < t < (n)T+T \tag{16}$$

and as $$\vartheta_1(t,t_{n+1}) = 2\pi(f+\mu_f)t - 2\pi(f+\mu_f)\tau_{n+1}^1 + \sigma_{\phi,t_{n+1}} + \theta + \Theta(n)T < t < (n)T+T \tag{17}$$

where $\Theta = 2\pi(f+\mu_f)T$

The difference between the phase terms of the data sampled via channel 2 at time n and via channel 1 at time n+1 is $$\vartheta_1(t,t_{n+1}) - \vartheta_2(t,t_n) = 2\pi(f+\mu_f)t - 2\pi(f+\mu_f)\tau_{n+1}^1 + \sigma_{\phi,t_{n+1}} + \theta + \Theta - 2\pi(f+\mu_f)t + 2\pi(f+\mu_f)\tau_{n+1}^1 - \sigma_{\phi,t_n} - \theta = \sigma_{\phi,t_{n+1}} - \sigma_{\phi,t_n} + \Theta \tag{18}$$

Notice that this phase term difference is not a function of fast time t, however, there are $T/T_{ad}$ fast time samples of this term that can be averaged together. The emitter's phase deviation is estimated using equation (18). Some embodiments estimate the phase deviation by integrating the differential phase terms produced by equation (18) as follows $$\hat{\sigma}_{\varphi,t_n} = \sum_{n=1}^{N-1} \frac{1}{T/T_{ad}} \sum_{k=1}^{k=T/T_{ad}} [\{\vartheta_1(t,t_{n+1}) - \vartheta_2(t,t_n)\} - \hat{\Theta}] = \sum_{n=1}^{N-1} \Delta\sigma_{\varphi,t_k} \tag{19}$$

where $\hat{\Theta}$, an estimate of Θ from equation (18), is calculated using the mean frequency error estimate $\hat{\mu}_f$, that is, $$\hat{\Theta} = 2\pi(f+\hat{\mu}_f)T. \tag{20}$$

The phase deviation estimate may then be used to apply a correction to the phase measurement captured via a given channel. The resulting corrected phase is appropriate for use in solving for the location coordinates $(x_t, y_t)$. The baseband frequency-transformed signal as defined in equation (8) is utilized to make the desired phase correction. Uncorrected phase measurements are obtained by sampling the array defined by equation (8) along the row that corresponds to $\hat{\mu}_f$. Recalling that $\hat{\mu}_f$ is an average of selected row indices of the array, it may be necessary in some instances to round the value of $\hat{\mu}_f$ to the nearest row (i.e., frequency) index. Corrected phase measurements are obtained by subtracting the estimated phase deviation $\hat{\sigma}_{\phi,t_n}$ from the uncorrected phase measurements.

The corrected phase measurements may be modeled as follows $$\theta_{meas}(t_n) = -2\pi(f+\mu_f)\tau_n^1 + \sigma_{\phi,t_n} + \theta - \hat{\sigma}_{\phi,t_n} = -2\pi(f+\mu_f)\tau_n^1 + \theta + \sigma_{error} \quad (21)$$

where $\sigma_{error}$ is the error that results from subtracting the aforementioned estimate, $\hat{\sigma}_{\phi,t_n}$, of the actual phase deviation $\sigma_{\phi,t_n}$. (Equation (21) ignores phase measurement errors from thermal noise and spatial sampling error, i.e., when $\tau_n^2 \neq \tau_{n+1}^1$). Equation (21) contains three unknown parameters $x_t$, $y_t$, and $\theta$. For each channel, the corresponding row of the equation (8) array, as selected according to $\hat{\mu}_f$, contains N uncorrected phase measurements from which the corrected phase measurements may be obtained. The Gauss-Newton method may be applied with respect to the model of equation (21) and the corrected phase measurements to determine the desired location coordinates $(x_t, y_t)$.

Various embodiments use various techniques to determine the estimate $\hat{\sigma}_{\phi,t_n}$ of the emitter's phase deviation. For example, some embodiments use curve-fitting techniques to fit the phase measurements from equation (19) to a function that models the emitter's phase deviation as a second order polynomial, fitting the phase measurements to the derivative of the polynomial.

The Gauss-Newton method is well known, as described, for example, in the following, both of which are incorporated herein by reference:

Foy, W. H. "Position-Location Solutions by Talyor-Series Estimation," *IEEE Transactions on Aerospace and Electronic Systems*, Vol. AES-12, No 2, March 1976, pp 187-193; and Kay, Steven M., *Fundamentals of Signal Processing, Estimation Theory*, Prentice Hall PTR, 1993.

It is well known in the art that the Gauss-Newton method permits combination of mixed measurements such as range, TOA, FOA, AOA (angle of arrival), etc. The technique uses for each measurement a general equation that is a function of the parameters to be estimated $$f_n(x_t, x_n) = u_n = m_n - e_n, \quad n = 1, 2, \ldots, N \quad (22)$$

where $u_n$ is the correct value, $m_n$ is the measured value, $e_n$ is an unknown measurement error, $x_t$ is a vector containing the emitter location, and $x_n$ is a vector containing the receiver location at sample n. For the two dimensional geometry of FIG. 1, $$x_t = \begin{pmatrix} x_t \\ y_t \end{pmatrix} \text{ and } x_n = \begin{pmatrix} x_n \\ y_n \end{pmatrix} \quad (23)$$

Note that equation (22) is a function that maps known information $x_n$ and unknown information $x_t$ into a scalar value, and that several independent noisy measurements of the scalar value are available. Assuming a straight flight path and using the geometry defined in FIG. 1, $$\begin{pmatrix} x_n \\ y_n \end{pmatrix} = \begin{pmatrix} 0 \\ y_t + n\Delta L \end{pmatrix} \quad (24)$$

The model equation for the corrected phase measurement is $$f_n(x_t, x_n) = \theta_{meas}(t_n) = -2\pi(f+\mu_f)\tau_n^1 + \theta \quad (25)$$

where $$c\tau_n = R(t_n) = \sqrt{x_t^2 + (y_t - n\Delta L)^2} \quad (26)$$

and for channel 1, $$m_n = \theta_{meas}(t_n) = -2\pi(f+\mu_f)\tau_n^1 + \sigma_{error} + \theta \quad (27)$$

Expanding $f_n(x_t, x_n)$ in a Taylor series about an initial guess for $x_t$, i.e., setting $x_t = x_v$ and expanding, $$f_n(x_v, x_n) + a_{n1}\delta x + a_{n2}\delta y \cong m_n - e_n \quad (28)$$

Equation (28) represents a set of equations that may be combined into a matrix form as $$A\delta = u - f(x_v) = m - f(x_v, x_n) - e \quad (29)$$

where $x_v$ is the local coordinate vector that $f_n$ is expanded about, A is the Jacobian matrix with respect to the unknown emitter location vector $x_t$, and $\delta$ is the incremental position vector defined as $$\delta = \begin{bmatrix} \delta x \\ \delta y \end{bmatrix} \quad (30)$$

Combing the measurement, $m_n$ and the functions $f(x_v, x_n)$ gives $$A\delta = z - e \quad (31)$$

where, from equation (29), z is the measurement vector with the initial guess subtracted from it.

Equation (31) is linear in the unknown parameters $\delta$. Using weighted least squares methods such as described in the aforementioned Kay text, the objective function to be minimized may be defined as $$J(\delta) = (z - A\delta)^T W(z - A\delta) \quad (32)$$

Solving for $\hat{\delta}$ gives $$\hat{\delta} = \{[A^T R^{-1} A][A^T]\}^{-1} R^{-1}[m_k - f(x_v, x_k)] = \{[A^T R^{-1} A][A^T]\}^{-1} R^{-1} z \quad (33)$$

where R is the covariance matrix of the measurement errors e. The estimate $\hat{\delta}$ is the difference between the initial guess, $x_v$, and the current estimate of $x_t$. The current estimate is then used as next guess such that $$x_v(k) = x_v(k-1) + \hat{\delta} \quad (34)$$

The iteration process continues until $\hat{\delta}$ converges.

Below are defined the values of Jacobian matrix A for the phase measurements. Recall that the corrected measured phase term, for a single channel, over the observation interval is given as $$\theta_{meas}(t_n) = -2\pi(f+\mu_f)\tau_n^1 + \sigma_{error} + \theta \quad (35)$$

where $\tau_n^1$ is a function of $x_t$. The Jacobian matrix is $$A = \begin{pmatrix} \frac{\partial \theta_{meas}(t_1)}{\partial x_t} & \frac{\partial \theta_{meas}(t_1)}{\partial y_t} & \frac{\partial \theta_{meas}(t_1)}{\partial \theta} \\ \ldots & \ldots & \ldots \\ \frac{\partial \theta_{meas}(t_N)}{\partial x_t} & \frac{\partial \theta_{meas}(t_N)}{\partial y_t} & \frac{\partial \theta_{meas}(t_N)}{\partial \theta} \end{pmatrix} \in R^{N \times 3} \quad (36)$$

where $$\frac{\partial \theta_{meas}(t_n)}{\partial x_t} = \frac{-2\pi(f+\mu_f)\tau_n^1 + \sigma_{error} + \theta)}{\partial x_t} \quad (37)$$

$$= \frac{-2\pi(f+\mu_f)\partial \tau_n^1}{\partial x_t} = \frac{-2\pi(f+\mu_f)\partial \frac{R^1(t_n)}{c}}{\partial x_t}$$

$$= -2\pi \frac{(f+\mu_f)}{c} \frac{(x_t)}{R^1(t_n)}$$

Likewise, $$\frac{\partial \theta_{meas}(t_n)}{\partial y_t} = -2\pi \frac{(f+\mu_f)}{c} \frac{(y_t - n\Delta L)}{R^1(t_n)} \quad (38)$$

And, $$\frac{\partial \theta_{meas}(t_n)}{\partial \theta} = \frac{-2\pi(f+\mu_f)\tau_n^1 + \sigma_{error} + \theta)}{\partial \theta} \quad (39)$$

$$= 1$$

Figure 2:
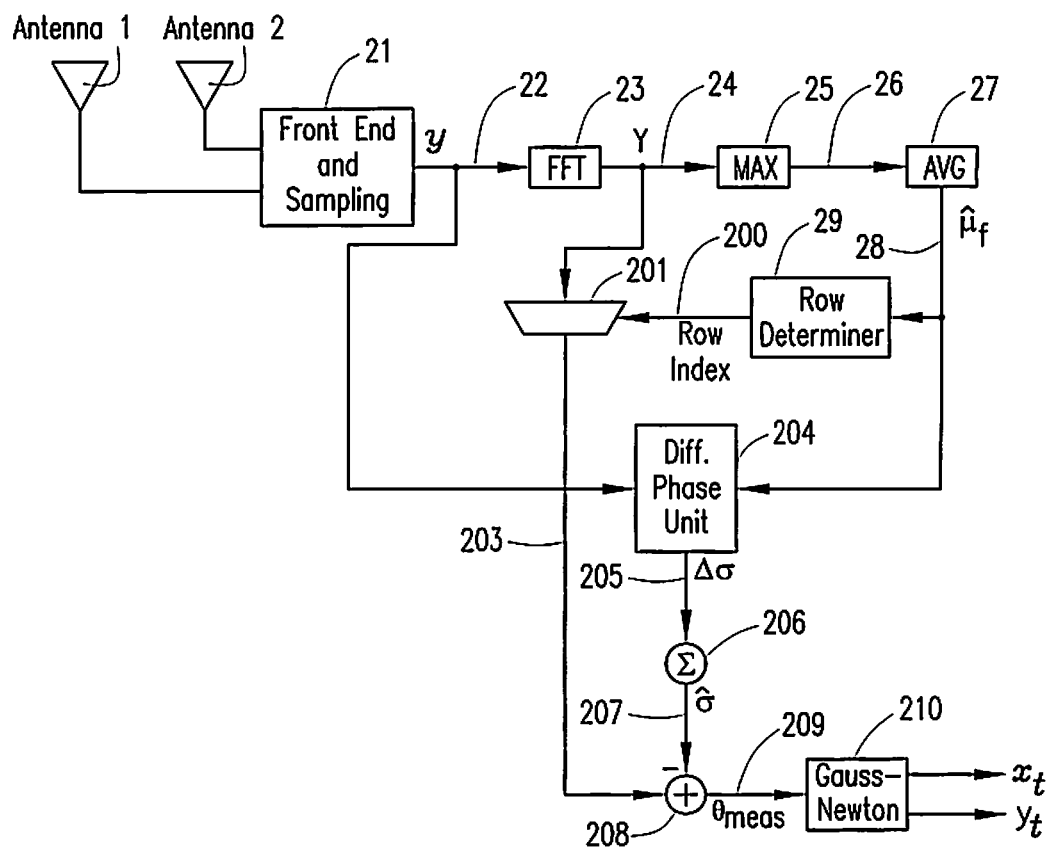
FIG. 2 diagrammatically illustrates a method and apparatus for determining the location of a land-based emitter from an airborne platform.

FIG. 2 diagrammatically illustrates an apparatus to be carried on an airborne platform (such as shown in FIG. 1) for determining the location of an emitter according to exemplary embodiments of the of the present work. FIG. 2 correspondingly illustrates operations of the above-described method for determining emitter location. A front end and sampling portion 21 utilizes conventional techniques to receive and sample, via both antennas, RF signals produced by the emitter of FIG. 1. The output 22 of the front end and sampling portion 21 contains, for each channel, the array $y_{rx,b}(t,t_n)$ of equation (6). These arrays are designated generally as y in FIG. 2.

An FFT unit 23 receives the output 22, and applies conventional FFT processing to the columns of the each channel's array $y_{rx,b}(t,t_n)$. The output 24 of the FFT unit 23 contains, for each channel, the array $Y_{rx,b}(f,t_n)$ of equation (8). These arrays are designated generally as Y in FIG. 2. A maximum value determiner 25 receives the output 24 and determines the maximum absolute value in each column of each array (or in only a selected one of the arrays in some embodiments). The frequency (i.e., row) indices of $Y_{rx,b}(f,t_n)$ corresponding to the determined maximum values are provided at 26 to an averaging unit 27, which produces at 28 an average value that is the estimate $\hat{\mu}_f$ of the mean frequency error $\mu_f$. If necessary, a row determiner 29 rounds the average value $\hat{\mu}_f$ to the nearest frequency index of the array $Y_{rx,b}(f,t_n)$. This index 200 identifies the row of the $Y_{rx,b}(f,t_n)$ that is to be selected for further processing, and controls a row selector 201 that selects and outputs the corresponding row from each of the $Y_{rx,b}(f,t_n)$ arrays of the two channels. The rows selected from the $Y_{rx,b}(f,t_n)$ arrays of the two channels are designated generally at 203.

A differential phase unit 204 receives at 28 the estimate $\hat{\mu}_f$, and at 22 each channel's $y_{rx,b}(t,t_n)$ array. The differential phase unit 204 uses the estimate $\hat{\mu}_f$ and the time domain phase measurements contained in 22 to make the calculations required to produce at 205 the differential phase terms $\{\vartheta_1(t,t_{n+1})-\vartheta_2(t,t_n)\}-\hat{\Theta}$ defined in equations (19) and (20). The differential phase terms are also denoted as $\Delta\sigma_{\phi,t_k}$ in equation (20), and as simply $\Delta\sigma$ in FIG. 2. The differential phase terms at 205 are provided to a summing element 206 that produces at 207 the estimated phase deviation $\hat{\sigma}_{\phi,t_n}$ defined in equation (20), designated as simply $\hat{\sigma}$ in FIG. 2.

The estimated phase deviation 207 is subtracted at 208 from the frequency domain phase measurements contained in the selected rows at 203. The subtractions at 208 produce at 209 N corrected phase measurements, $\theta_{meas}(t_n)$, for each channel. These corrected phase measurements are designated generally as $\theta_{meas}$ in FIG. 2. The corrected phase measurements at 209 are available for Gauss-Newton processing at 210. As described above, the Gauss-Newton processing produces the desired estimate of the emitter's location coordinates $(x_t, y_t)$.

Although exemplary embodiments are described above in detail, this does not limit the scope of the invention, which can be practiced in a variety of embodiments.

What is claimed is:

1. An apparatus adapted to be carried on an airborne platform for determining the location of a land-based radio frequency (RF) emitter, comprising:
   first and second antennas for receiving RF signaling from the RF emitter;
   an antenna mount configured to support said antennas for travel on the airborne platform at a predetermined distance from one another in a flight direction of the airborne platform;
   a sampling portion coupled to said antennas and responsive to the received RF signaling to produce signal samples for both of said antennas, said sampling portion configured to produce, while said antennas travel on the airborne platform in said flight direction, first and second said signal samples for said first and second antennas, respectively, at first and second sampling times, respectively, wherein said first and second sampling times are temporally adjacent one another in a sampling sequence implemented by said sampling portion, and wherein said first and second antennas respectively occupy a same spatial location at said first and second sampling times; and
   a processing portion coupled to said sampling portion for processing said signal samples to determine the location of the RF emitter.

2. The apparatus of claim 1, wherein said first and second sampling times define therebetween a sampling time interval, and wherein said sampling time interval corresponds to a ratio of said predetermined distance to a travel velocity of the airborne platform.

3. The apparatus of claim 2, wherein said processing portion is responsive to at least some of said signal samples for producing an estimate of a component of phase noise associated with said RF signaling, and is responsive to said estimate for compensating for said phase noise in said location determination.

4. The apparatus of claim 3, wherein said component varies during said sampling interval.

5. The apparatus of claim 4, wherein said component is a phase deviation component, and wherein said processing portion is configured to determine a difference between said first and second signal samples, and to use said difference to produce said estimate.

6. The apparatus of claim 3, wherein said component is a mean frequency error component, and wherein said processing portion is configured to transform said at least some of said signal samples into corresponding frequency domain samples, and to use said frequency domain samples to produce said estimate.

7. The apparatus of claim 1, wherein said processing portion is responsive to at least some of said signal samples for producing an estimate of one of a mean frequency error component and a phase deviation component of phase noise associated with said RF signaling, and is responsive to said estimate for compensating for said phase noise in said location determination.

8. The apparatus of claim 7, wherein said processing portion is configured to perform nonlinear least-squares processing, after said compensating, to complete said location determination.

9. An aircraft adapted to determine the location of a land-based RF emitter, comprising:
    first and second antennas supported at a predetermined distance from one another in a flight direction of said aircraft for receiving RF signaling from the RF emitter;
    a sampling portion coupled to said antennas and responsive to the received RF signaling to produce signal samples for both of said antennas, said sampling portion configured to produce, while said antennas travel with said aircraft in said flight direction, first and second said signal samples for said first and second antennas, respectively, at first and second sampling times, respectively, wherein said first and second sampling times are temporally adjacent one another in a sampling sequence implemented by said sampling portion, and wherein said first and second antennas respectively occupy a same spatial location at said first and second sampling times; and
    a processing portion coupled to said sampling portion for processing said signal samples to determine the location of the RF emitter.

10. The aircraft of claim 9, wherein said first and second sampling times define therebetween a sampling time interval, and wherein said sampling time interval corresponds to a ratio of said predetermined distance to a travel velocity of said aircraft.

11. A method of determining the location of a land-based RF emitter from an airborne platform, comprising:
    receiving RF signaling from the RF emitter via first and second antennas maintained at a predetermined distance from one another in a flight direction of the airborne platform;
    in response to the received RF signaling, producing signal samples for both of said antennas, including producing first and second said signal samples for said first and second antennas, respectively, at first and second sampling times, respectively, wherein said first and second sampling times are temporally adjacent one another in a sampling sequence implemented by said sampling portion and wherein said first and second antennas respectively occupy a same spatial location at said first and second sampling times; and
    processing said signal samples to determine the location of the RF emitter.

12. The method of claim 11, wherein said first and second sampling times define therebetween a sampling time interval, and wherein said sampling time interval corresponds to a ratio of said predetermined distance to a travel velocity of the airborne platform.

13. The method of claim 12, wherein said processing includes producing in response to at least some of said signal samples an estimate of a component of phase noise associated with said RF signaling, and using the estimate to compensate for said phase noise in said location determination.

14. The method of claim 13, wherein said component varies during said sampling interval.

15. The method of claim 14, wherein said component is a phase deviation component, and wherein said estimate producing includes determining a difference between said first and second signal samples.

16. The method of claim 13, wherein said component is a mean frequency error component, and wherein said estimate producing includes transforming said at least some of said signal samples into corresponding frequency domain samples.

17. The method of claim 1, wherein said processing includes producing in response to at least some of said signal samples an estimate of one of a mean frequency error component and a phase deviation component of phase noise associated with said RF signaling and, in response to the estimate, compensating for said phase noise in said location determination.

18. The method of claim 17, wherein said processing includes, after said compensating, performing nonlinear least-squares processing to complete said location determination.

* * * * *